R. B. CANTRELL.
Self-Loading Carts.
No. 138,854. Patented May 13, 1873.
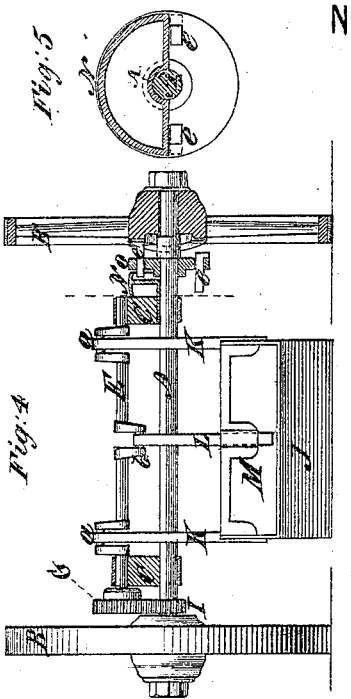
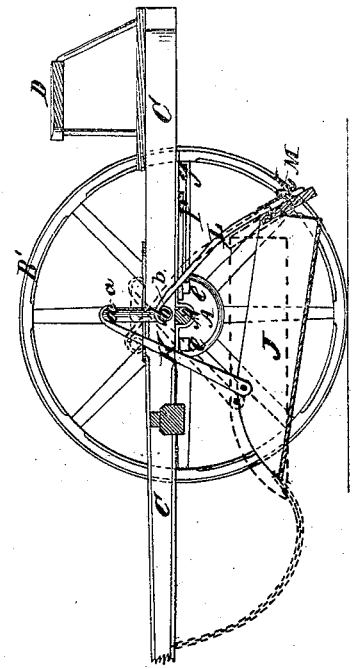
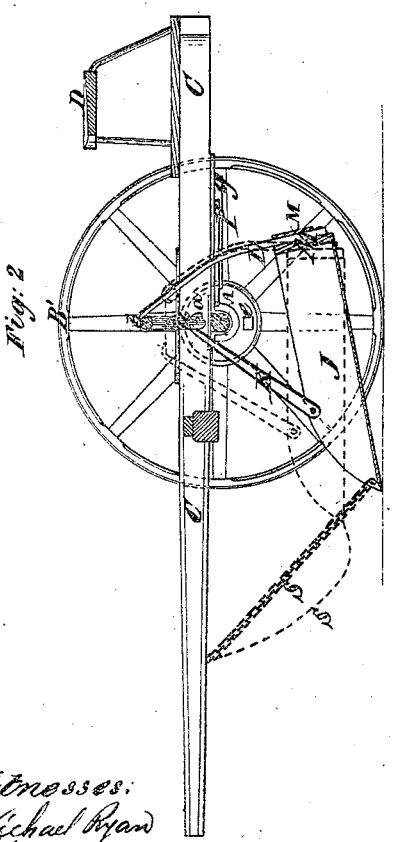
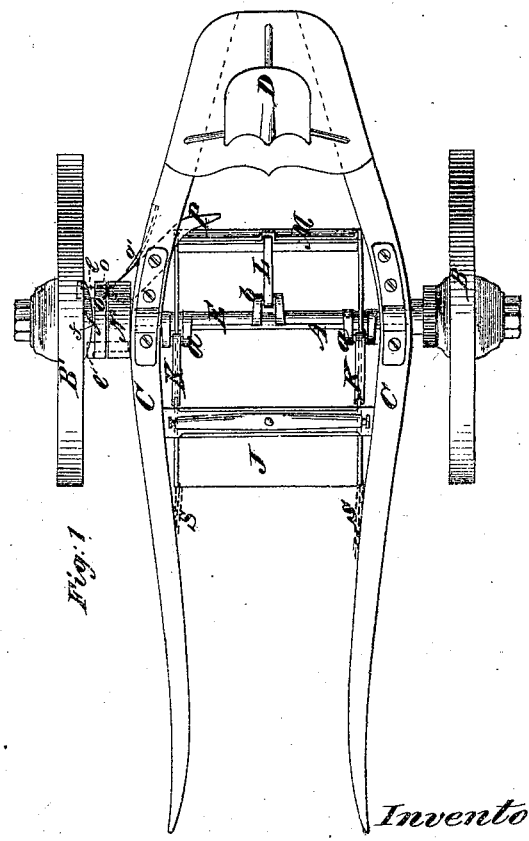
Witnesses:
Michael Ryan
Fred Haynes
Inventor:
Rob't B. Cantrell

UNITED STATES PATENT OFFICE.

ROBERT B. CANTRELL, OF TENAFLY, ASSIGNOR TO WILLIAM D. RUSSELL, OF NEWARK, NEW JERSEY.

IMPROVEMENT IN SELF-LOADING CARTS.

Specification forming part of Letters Patent No. 138,854, dated May 13, 1873; application filed September 16, 1872.

*To all whom it may concern:*

Be it known that I, ROBERT B. CANTRELL, of Tenafly, in the county of Bergen and State of New Jersey, have invented an Improved Self-Loading Dirt-Cart, of which the following is a specification:

This invention consists in the combination of cranks on a shaft geared with the axle of the cart, a scoop suspended from the said cranks and constituting the cart-body, and a tail-board to the latter, whereby, in the passage of said cart over the ground, the scoop may be brought to a position to scoop up the earth, a position to carry the same, or a position to dump it, or may be raised to a position high above the ground to facilitate the travel of the cart from place to place. It also consists in the combination of projections on the hub of one of the cart-wheels, a coupling-plate and sliding teeth of novel construction secured to the axle, and a stationary guard-plate, whereby said wheel may be temporarily locked with the axle for the purpose of driving the aforesaid cranked shaft and shifting the position of the scoop.

In the accompanying drawing, Figure 1 is a plan or top view of a dirt-cart constructed according to my invention. Fig. 2 is a central longitudinal section of the same. Fig. 3 is a similar section representing the scoop in different positions. Fig. 4 is a transverse section thereof; and Fig. 5 is a detail view of a coupling embraced in my invention.

Similar letters of reference indicate corresponding parts in the several figures.

A is the axle of the cart; B B' are the wheels thereof; and C is its frame, consisting essentially of two shafts secured to the axle by suitable bearing-pieces, and connected in rear thereof to support the driver's seat D, and braced in front to strengthen them and afford a means of attachment for the whiffle-tree. The wheels B B' are loose on their axle; but when desirable the one, B', may be locked to said axle, so as to turn the latter with it by means of suitable mechanism presently to be described. Above the axle A there is supported in the frame C a shaft, E, furnished with three cranks, $a\ a$ and $b$, the middle one, $b$, of which extends in the opposite direction to the other two. A gear-wheel, G, on this shaft gears with a pinion, I, on the axle A, and thereby the said shaft is turned incidentally with the turning of the axle. The scoop J, which forms the body of the cart, is suspended from the cranks on the shaft E. It is of the shape of an enlarged shovel, having its side edges turned up, and having pivoted to them at the back a movable tail-board, M, to facilitate the dumping of the load. It is suspended by means of rods K K pivoted to the forward part of its sides and connected with the cranks $a\ a$ on the shaft E, and by a rod, L, rigidly secured to the tail-board M, and connected with the crank $b$. It is dragged forward so as to scrape and dig along the ground by chains S attached to the shafts of the cart. There is secured to that side of the frame C, opposite the hub of the wheel B', a semicircular plate, N, which I term a stationary guard-plate, and is arranged concentric to the axle A. Between this plate and the wheel B' there is rigidly secured to the axle a circular coupling-plate, O, furnished at opposite points with two teeth, $e\ e$, which are free to slide out, so as to come in contact with the hub of the wheel B'. This hub, in opposite points of its inner side, has notches between which are the projecting portions $f\ f$, one of which is shown in Fig. 1. P is a lever, which is pivoted to the under side of that part of the frame C adjacent to the wheel B', in such position that one end projects in front of the driver's seat, and the other end may be made to project under and past the guard-plate N to throw out one of the teeth in the coupling-plate, as will be presently described. A spring, $g'$, is applied to this lever to keep the end last mentioned under the frame, except when forced out by the application of the driver's foot to the other end.

The cart is used as follows: A horse is hitched to the shafts of the cart, and the latter is drawn over the ground to the place where the digging is to be done. On its arrival there the driver, with his foot on the inner end of the lever P pushes out its forward end, and this coming in contact with one of the teeth $e$ in the coupling-plate forces it out, so that its outer end is in contact with the front or forward part of one of the projections $f$ on the hub of the wheel B', and its inner end is beyond the outer surface of the guard-plate N. The coupling-plate and consequently the axle A is thereby locked with the wheel B', and the lever is held in this position by the driver until the back end of the tooth $e$, thrown out, passes in front of the guard-plate N, when the latter holds it in contact with the hub of the wheel for half a revolution of the wheel B', till the tooth has passed the guard-plate. When this occurs the projection $f$, with which it was in contact, throws it back and passes on. By the time the tooth passes the guard-plate the other tooth will be brought opposite the end of the lever P. The wheel and axle, by reason of the semicircular form of the guard-plate which holds the teeth out, as before mentioned, and the pinion I on the axle A being only one-half the size of the wheel G on the shaft E, with which it gears, the said shaft is driven by each coupling of the wheel and axle but a quarter of a revolution. The driver repeats the operation above described as often as necessary to bring the cranks on the shaft E, which, of course, is rotated by the rotation of the axle, into the position shown in bold outline in Fig. 2, with the cranks $a\ a\ b$, upright or inclined, to the frame C of the cart nearly in line with the rods K K, the two cranks $a\ a$ that support the fore end of the scoop J being forward and considerably depressed. The fore end of the scoop is thus held in a position to scrape the earth up into it, and its traction is effected by the chains S. The earth scraped or dug up is carried by the forward motion of the cart up into the body of the scoop and fills the latter. When the scoop is full the driver, by means of the lever P, again throws out a tooth, $e$, and thereby couples the wheel B' and its axle for another quarter revolution. The cranks $a\ a\ b$ are thus brought to a position at right angles to that which they last occupied, and now have a reverse incline to the frame C. By this change in the position of the cranks the scoop is brought into the position shown in dotted outline in Fig. 2, and the cart may be drawn to the place where the load is to be dumped. To dump the load, the wheel and axle are again coupled to shift the shaft E another quarter revolution. The cranks $a\ b$ now occupy the same inclination they did in the first position, but are on reverse sides of their shaft E, the crank $b$ being forward. The fore end of the scoop is by this means elevated and its rear end depressed, and the tail-board opened, as represented in bold outline in Fig. 3, so that the whole load may slip out through the back of said scoop. After this the driver couples the wheel and axle, as before, till the scoop again occupies the position shown in dotted outline in Fig. 2, and then the cart is returned to the digging-ground.

When the cart is going to and from the place where it is kept, the scoop is shifted high up from the ground, to the position shown in dotted outline in Fig. 3. This is effected in the same way as before by coupling and recoupling, if necessary, the wheel and axle, till the cranks are brought to the required position.

Thus without getting down from his seat or stopping the cart the driver may load it, carry the load to a convenient place and dump it, and afterward return to the digging-ground and repeat the operation.

Claims.

1. The combination of the scoop or cart-body J, its tail-board M, the three-cranked shaft E, and the rods K K L, substantially as and for the purpose set forth.

2. The combination of the projections $f\ f$ on the hub of one of the supporting-wheels, the coupling-plate O secured to the axle A, the sliding teeth $e\ e$, the stationary guard-plate N, and the crank-shaft E, geared with the axle, the whole arranged and operating substantially as and for the purpose described.

ROBT. B. CANTRELL.

Witnesses:
MICHAEL RYAN,
FRED. HAYNES.